United States Patent [19]
Sato et al.

[11] Patent Number: 4,810,978
[45] Date of Patent: Mar. 7, 1989

[54] OPTICAL DATA LINK

[75] Inventors: Robert N. Sato, Palos Verdes; O. Glenn Ramer, Los Angeles, both of Calif.

[73] Assignee: Hughes Aircraft Company, Los Angeles, Calif.

[21] Appl. No.: 67,347

[22] Filed: Jun. 29, 1987

[51] Int. Cl.[4] .................. H04N 7/18; H01L 33/02; G02F 1/13
[52] U.S. Cl. .................. 332/7.51; 250/332; 374/161
[58] Field of Search .................. 332/7.51; 250/332; 455/611; 374/161, 162, 131; 350/96.14, 28; 370/4; 356/216, 217, 234, 235, 226

[56] References Cited

U.S. PATENT DOCUMENTS

| | | | |
|---|---|---|---|
| 3,899,430 | 8/1975 | Archer-Soloman | 332/7.51 |
| 4,236,243 | 11/1986 | Davies et al. | 370/3 |
| 4,338,627 | 7/1982 | Stapleton | 250/332 |
| 4,390,974 | 6/1983 | Sievs | 332/7.51 |
| 4,525,687 | 6/1985 | Chewla et al. | 332/7.51 |
| 4,594,507 | 6/1986 | Elliott et al. | 250/332 |
| 4,683,448 | 7/1987 | Duchet et al. | 332/7.51 |
| 4,719,412 | 1/1988 | d'Humierey et al. | 332/7.51 |

FOREIGN PATENT DOCUMENTS

| | | |
|---|---|---|
| 134488 | 3/1985 | European Pat. Off. |
| 2401267 | 7/1975 | Fed. Rep. of Germany ...... 250/332 |
| 2752704 | 4/1978 | Fed. Rep. of Germany |

Primary Examiner—Nelson Moskowitz
Attorney, Agent, or Firm—Ronald L. Taylor; William J. Streeter; A. W. Karambelas

[57] ABSTRACT

The invention concerns an optical detection matrix (9) contained within a cryogenic chamber (3). Electrical image signals produced by the matrix (9) are converted into optical signals and transmitted out of the chamber (3) on lines 42A–42T. The optical signals on lines 42A–42T are converted into electrical signals carried on line 56.

5 Claims, 3 Drawing Sheets

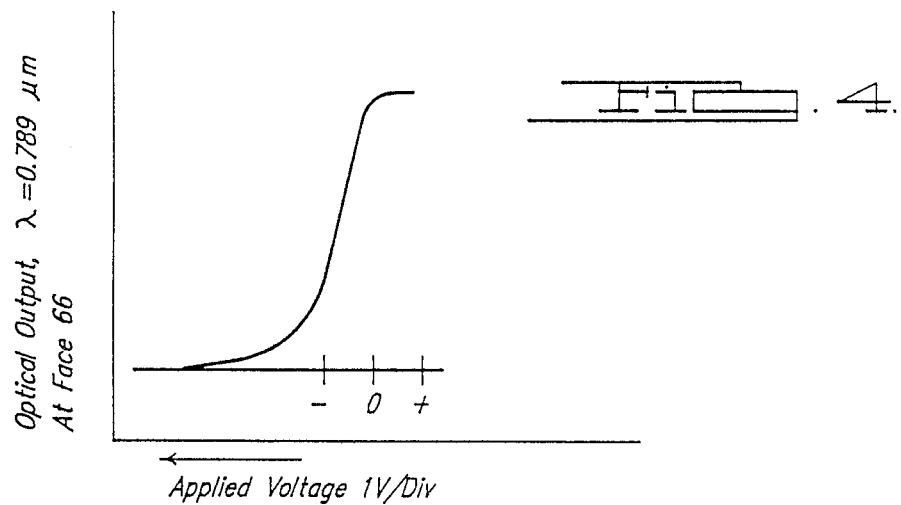
FIG. 4.
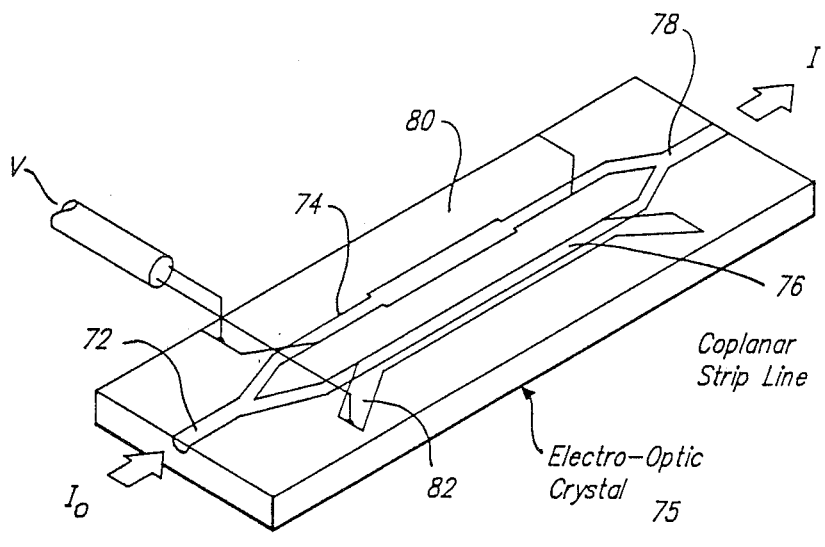
FIG. 5.
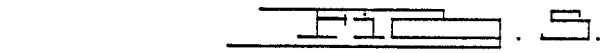
FIG. 6.
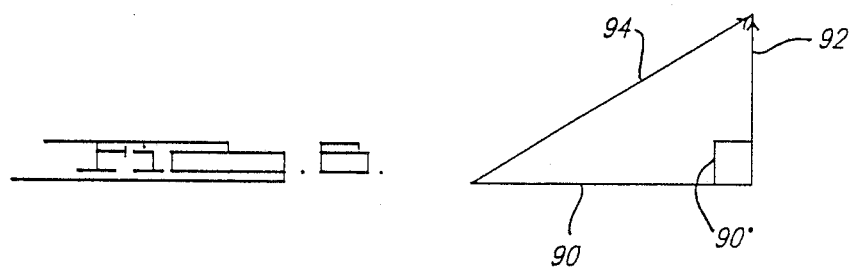

OPTICAL DATA LINK

BACKGROUND OF THE INVENTION

1. Field of the Invention

The invention relates to an optical modulator which modulates the intensity of a light beam in response to a sampled analog electrical signal. The invention further relates to a system which utilizes such a modulator to transmit signals from an array of infrared detectors contained within a cryogenic chamber.

2. Discussion

Sensor systems commonly use a mosaic focal plane array of infrared (IR) detectors contained within a low-temperature, cryogenic chamber. The reason for the use of a cryogenic chamber is that the IR detector can only operate at a specified cryogenic temperature and thus the readout circuit must also operate at the same temperature of the IR detector in order to maintain the desired signal-to-noise ratio.

To deliver the signals outside the chamber, a transmission line in the form of a coaxial cable or twisted shielded wire is used. The distributed capacitance of the transmission line, as well as the capacitance between the transmission line and the cryogenic chamber (which generally has metallic walls), limits the speed of data transmission.

One solution to the capacitance problem is to use an optical transmission line. This optical interface eliminates heat transfer into the cryogenic chamber through conventional wire, eliminates electromagnetic interference including cross talk and noise pickup, eliminates high-power transmission line drivers with transmission loads, and has advantages of weight and sizes.

SUMMARY OF THE INVENTION

In one form of the invention, an array of infrared (IR) detector sensors induce signals in response to photons projected upon the array. The array is contained within a cryogenic chamber. The signals must be transmitted out of the chamber for signal and data processing. The transmission is accomplished by directing light into the chamber using a light waveguide, modulating a characteristic of the light (e.g., intensity or phase), and then transmitting the modulated light out of the chamber via fiber optics. The image signals of the array are used to modulate the light.

BRIEF DESCRIPTION OF THE DRAWINGS

FIG. 4 illustrates the output intensity as a function of applied voltage of the modulator 24.

FIG. 5 illustrates another type of modulator.

FIG. 6 illustrates vector addition.

DETAILED DESCRIPTION OF THE INVENTION

Figure 1:
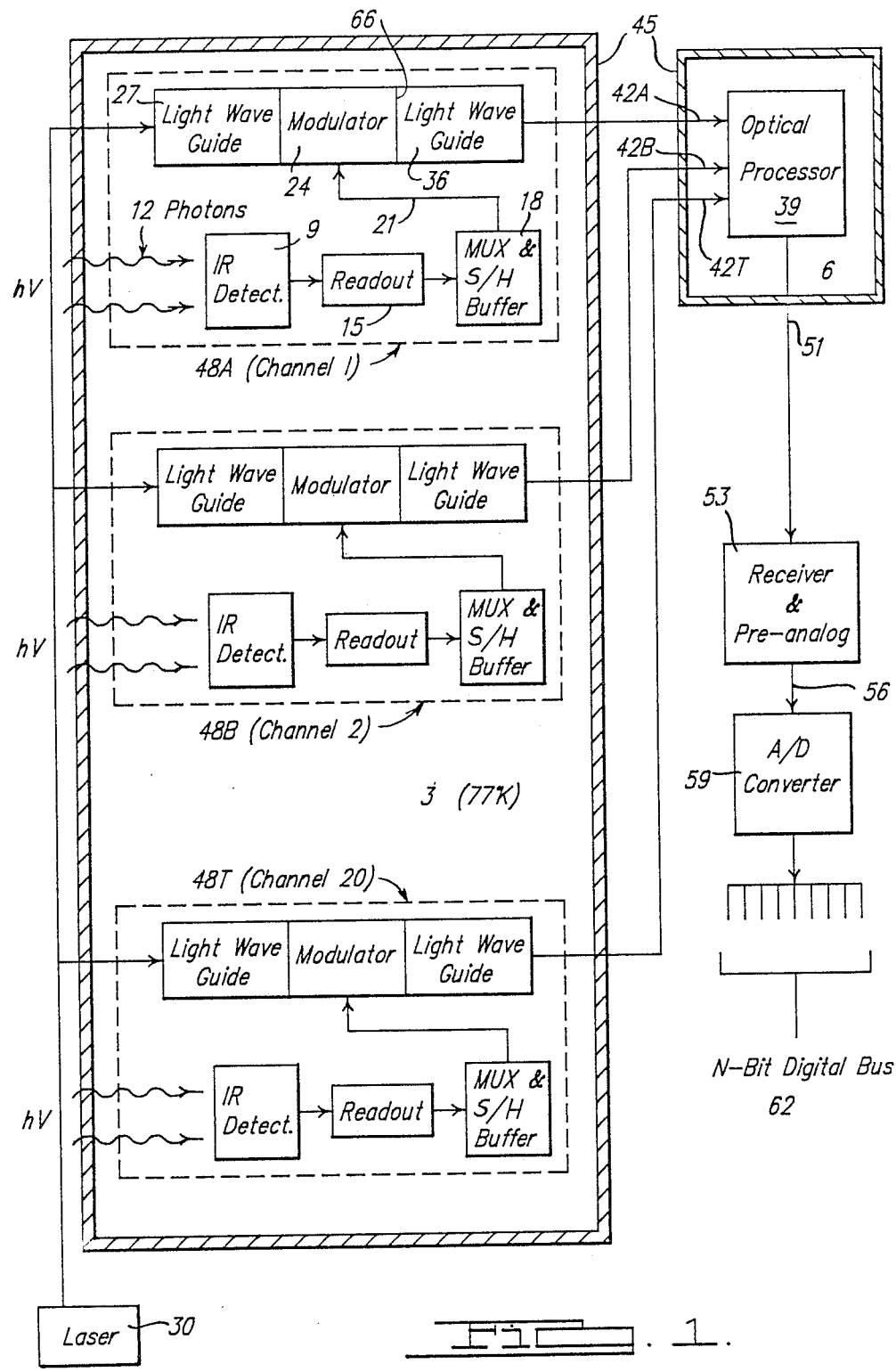
FIG. 1 is a schematic illustrating one form of the invention.

FIG. 1 illustrates two cryogenic chambers 3 and 6. Chamber 3 and 6 are held at 77 degrees K. Such chambers are known in the art. A column 9 of infrared detectors responds to incoming photons 12. Such detectors are commonly used in target surveillance, acquisition and tracking applications.

Readout circuitry 15 interfaces each element of the IR detector column and delivers signals to a multiplexer (MUX) and buffer 18 where they are sampled and held temporarily and then serially sent along line 21 to modulator 24. The signals on line 21 are indicative of the light intensity received by each IR detector element. Modulator 24 also accepts the unmodulated light from a light wave guide 27, and the unmodulated light is provided by laser 30 outside the chamber through optical fiber 33. Laser 30 is preferably a III-V compound solid-state laser, and the frequency of the laser light will depend upon the type of modulator used, as discussed below.

Modulator 24, in response to the magnitude of sampled analog signals on line 21, modulates the light fed through the light wave guide 27. Depending upon the type of modulator used, also discussed below, the light will be modulated either in phase or intensity. The modulated light is then guided by a light wave guide 36 and then transmitted to an optical processor 39 along optical fiber 42A. Optical fiber 42A passes through walls 45 which separate the chamber 6 from the chamber 3.

Dashed blocks 48B–48T (not all shown) represent additional channels which are identical to block 48A, which was just described. Accordingly, several channels (20 are indicated) provide modulated light signals along optic fibers 42A–42T, all received by optical processor 39. The optical processor 39 functions to multiplex the optical signals carried by fibers 42A–42T, and to transmit them along a single fiber 51 to a receiver and pre-analog amplifier 53, located external to the cryogenic chamber 6, at ambient temperature. Receiver 53 converts the optical signal on line 51 into an electrical signal on line 56. All of the signals described thus far from detectors 9 to receiver 53 have been analog signals, either electrical or optical. Analog to digital converter (A/D) 59 converts the signal on line 56 into an N-Bit digital signal on bus 62.

Processing circuitry (not shown) makes use of the N-Bit digital signal in a manner which need not be understood here.

Figure 2:
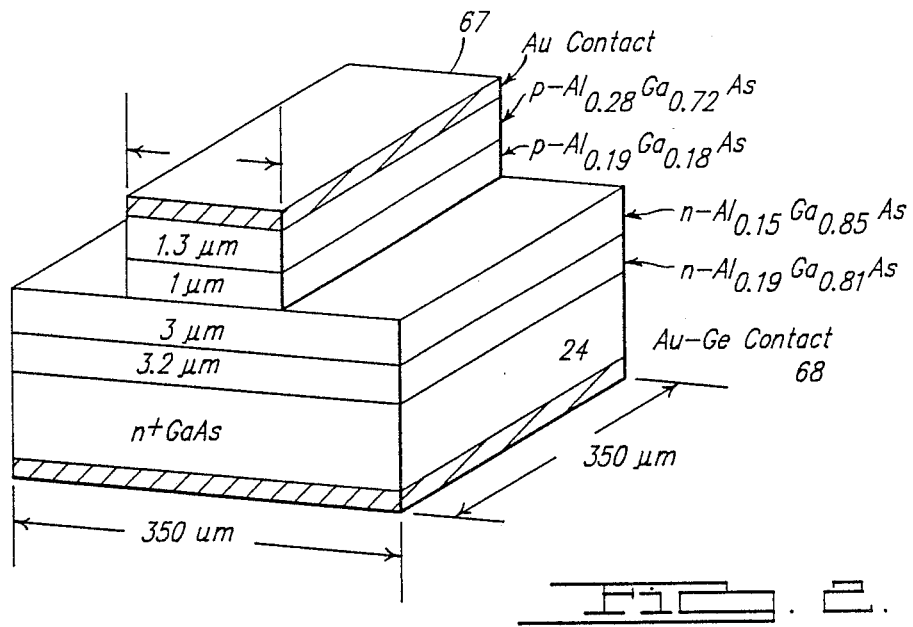
FIG. 2 illustrates a type of modulator 24 in FIG. 1.
Figure 3:
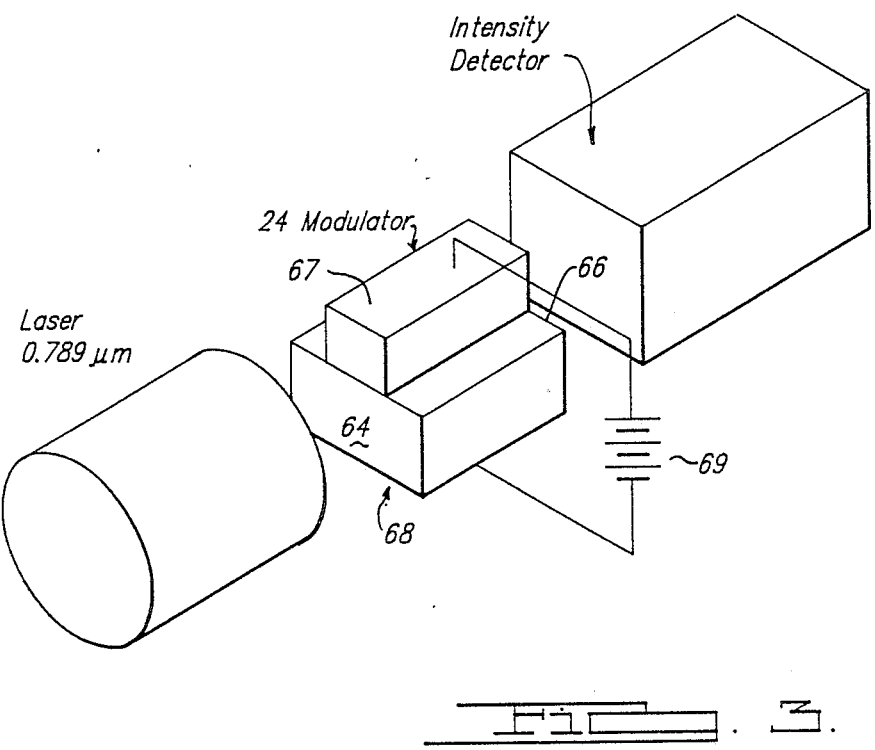
FIG. 3 illustrates an apparatus for measuring the optical attenuation provided by modulator 24.

Two different types of modulators will be discussed. A first type is a double-heterostructure wave guide electro-absorption modulator as shown in FIG. 2. The dimensions and composition of this modulator are considered to be fully explained by the annotations in the figure. The modulator can be constructed by liquid phase epitaxy, molecular beam epitaxy, or organo metallic chemical vapor deposition technique known in the art. The modulation provided by the modulator 24 was measured as shown in FIG. 3.

An 0.789 micron wave length GaAlAs laser was edge coupled to face 64. The optical intensity at the opposite face, face 66, was plotted as a function of the voltage (indicated by battery 69) applied to contacts 67 and 68. FIG. 4 shows this plot.

The reader can see that optical intensity at face 66, which corresponds to interface 66 in FIG. 1, is a function of the voltage across contacts 67 and 68. These contacts correspond to line 21 in FIG. 1: line 21 carries the time-varying voltage which modulates the light. The voltage is low-level, less than ten volts.

A second type of modulator is shown in FIG. 5. A lithium niobate ($LINbO_3$) crystal 75 contains a dielectric wave guide 72 which splits into two waves guides 74 and 76 which rejoin into a single wave guide at point 78. The dielectric guide is formed at temperatures of 1000° C. for six to ten hours by diffusing Ti stripes approximately four to eight micrometers in width and 500 angstrom in thickness into the LiNbo₃. After Ti diffusion, a buffer layer of $SiO_2$ approximately 1000 angstrom in thickness is applied to the entire chip surface. Laminated atop the split wave guides are two metallic film electrodes 80 and 82. The films are composed of Au and are approximately one micrometer thick.

The relative phase of the light in the modulator recombined at point 78 is a function of the potential between electrodes 80 and 82. At the point of recombination, the light in the two beams interfere producing two beams: guided and unguided. The unguided beam is scattered from the waveguide and lost while the guided beam is transmitted out of the device by waveguide 78. Specifically, this output beams intensity is found to follow the following transfer function: $I=I_o COS^2[V/V_{pi}]$. $I_o$ is the unmodulated light intensity, I is the output intensity, as shown in FIG. 5, V is the signal voltage applied between electrodes 80 and 82, $V_{pi}$ is a device-specific parameter, which is ten volts in the case of the Lithium Niobate device of FIG. 5. 1.3 micrometer is the preferred wave length of laser light.

As in the first modulator, shown in FIG. 4, the signals on electrodes 80 and 82 in FIG. 5 correspond to the signals on line 21 in FIG. 1. While the device of FIG. 5 operates by phase shifting and subsequent recombination of the shifted light beams, the measured parameter will actually be an intensity, not a phase.

Several important aspects of the invention will now be discussed.

1. The signal transmission rate of each channel via fibers 42A-42T in FIG. 1, is around several megahertz. The transmission rate from the optical processor to ambient temperature, that is, along fiber 51, is much faster, around one hundred megahertz, depending upon the channel transmission rate and the number of channels. The slower, 20 megahertz, rate in the low-temperature chamber reduces power dissipation, and thus reduces the tendency of the electronic components to raise the chamber temperature.

2. The preceding discussion has been framed in terms of an infrared thermography system. The inventors point out that the optical linkage provided by modulator 24 will enable the use of extremely high data transmission rates, with the result that the IR detector in FIG. 1 can contain an extremely large number of pixels, of the order of $10^6$ to $10^8$. Therefore, the optical resolution available can be significantly increased.

3. Two types of electro-optic modulators have been described. In both of these, the modulating IR induced signal (i.e., that on line 21 in FIG. 1) is a sampled analog signal for each pixel in the column.

4. The modulator of FIGS. 2-3 utilizes the multiple quantum well phenomenon. Electrons in the structure are contained within quantum wells. The electric field, indicated by battery 69 in FIG. 3, shifts the energy level of these excited electrons. The excited electrons then interact with incoming photons at near the same energy level, absorbing energy from the photons, thereby attenuating the light, as indicated in the plot of FIG. 4.

An invention has been described wherein IR induced signal of each detector in a focal plane array is sampled and the sampled analog signal is used to modulate the intensity of an incoming light beam entering a cryogenic chamber. The modulated light beam exits the chamber along a second wave guide and is processed in order to convert it to a multi-bit digital signal for each detector in the array. The resolution of digital signal corresponds to the dynamic range of light received by each detector.

Numerous substitutions and modifications can be undertaken without departing from the scope of the invention as defined by the following claims. For example, two optical waveguides 27 and 36 have been discussed in connection with FIG. 1. However, it is possible that a single optical waveguide, rather than two, can be used to carry the optical signals into and out of the chamber 3. The incoming light from laser 30 would travel through a beamsplitter, while the returning light would be deflected by the same beamsplitter to optical processor 39.

What is claimed is:

1. An imaging system which responds to incoming light, comprising:
   a source of light;
   at least one array of detector elements contained within a chamber for producing electrical signals in response to the incoming light;
   a modulator within the chamber for modulating the light from the source in response to signals applied to a modulating input thereof;
   readout means contained within the chamber for reading the signals produced by the elements of the array and for transmitting the signals to said modulating input of the modulator whereby the modulator modulates the light from the source and generates modulated optical signals which are a function of the amount of incoming light incident the detector elements;
   means for transmitting the modulated optical signals out of the chamber; and
   means for converting the optical signals to electrical digital signals.

2. An imaging system, comprising:
A. a first cryogenic chamber at a first temperature, which contains and has extending therefrom:
   (a) a plurality of detector means for producing image signals in response to incoming radiation;
   (b) an plurality of optical waveguides extending into the interior of the chamber from the exterior; and
   (c) a plurality of modulator means interconnected in the optical waveguides for modulating light which is carried by the waveguides, in accordance with the image signals;
B.
   (a) a second cryogenic chamber at a second temperature higher than the first;
   (b) a processor contained within the second chamber for
      (i) receiving modulated light on the plurality of optical waveguide lines;
      (ii) distributing the modulated light on a smaller plurality of optical waveguide lines for transmission out of the second chamber.

3. A thermal imaging system comprising:
A. several optical detection units, each comprising;
   (a) a first light waveguide for transmitting light into a chamber;
   (b) modulator means for modulating a characteristic of the light;
   (c) a second light waveguide for transmitting the modulated light out of the chamber (d) an array of elements which respond to thermal energy and develop and array of electrical thermal image signals (ETIS) in response;
(e) circuitry for presenting the ETIS signals to the modulator for modulating the light;
B. a common laser for providing light to each of the first waveguides;
C. several optical fibers for transmitting light from each of the second waveguides to a common optical processor which multiplexes the several optical signals into a sequence of electrical signals; and
D. means for converting the signals of the sequence into digital electrical signals.

4. A system according to claim 3 in which the modulator means comprises a device using the multiple quantum well phenomenon.

5. A system according to claim 2 and further comprising:
conversion means for receiving the optical signals transmitted out of the second chamber and converting the optical signals into electrical signals.

* * * * *